US006873723B1

United States Patent
Aucsmith et al.

(10) Patent No.: US 6,873,723 B1
(45) Date of Patent: Mar. 29, 2005

(54) SEGMENTING THREE-DIMENSIONAL VIDEO IMAGES USING STEREO

(75) Inventors: David W. Aucsmith, Portland, OR (US); David A. Romrell, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/346,499

(22) Filed: Jun. 30, 1999

(51) Int. Cl.[7] .................................. G06K 9/00
(52) U.S. Cl. ............... 382/154; 382/173; 382/219; 345/419; 348/586
(58) Field of Search .................. 382/154, 173, 382/199, 266, 281, 291, 219; 345/84, 419, 420, 421, 582; 348/159, 43, 586

(56) References Cited

U.S. PATENT DOCUMENTS

| 4,855,934 A | * | 8/1989 | Robinson .................. 345/582 |
| 5,179,441 A | * | 1/1993 | Anderson et al. ............. 348/43 |
| 5,202,928 A | * | 4/1993 | Tomita et al. .............. 382/154 |
| 5,606,627 A | * | 2/1997 | Kuo ........................... 382/154 |
| 5,825,915 A | * | 10/1998 | Michimoto et al. ......... 382/154 |
| 5,887,083 A | * | 3/1999 | Sumi et al. ................. 382/199 |
| 5,995,649 A | * | 11/1999 | Marugame .................. 382/154 |
| 6,205,260 B1 | * | 3/2001 | Crinon et al. .............. 382/284 |
| 6,348,953 B1 | * | 2/2002 | Rybczynski ................ 348/584 |
| 6,404,901 B1 | * | 6/2002 | Itokawa ...................... 382/103 |

* cited by examiner

*Primary Examiner*—Bhavesh M. Mehta
*Assistant Examiner*—Sheela Chawan
(74) *Attorney, Agent, or Firm*—Blakely, Sokoloff, Taylor & Zafman LLP

(57) ABSTRACT

The present invention is a method and apparatus to segment a three-dimensional scene having foreground and background regions. Regions in stereo images of the 3-D scene are matched. The stereo images include left and right images. Ranges of matched regions are computed. The foreground region is separated from the background region using the computed ranges of the matched regions.

27 Claims, 7 Drawing Sheets

SEGMENTING THREE-DIMENSIONAL VIDEO IMAGES USING STEREO

BACKGROUND

1. Field of the Invention

This invention relates to imaging. In particular, the invention relates to three-dimensional video processing.

2. Description of Related Art

Video communication has become important in modern computing platform. A typical video communication system involves motion estimation and image compression. Techniques for image compression of moving images are available such as Moving Picture Expert Groups (MPEG) standards.

Typical video communication involves three-dimensional (3-D) scenes. Examples include video conferencing, news transmission, sports events. In these examples, video images include people talking, players running in the field in the foreground. However, it is only the foreground region that contains images of interest. The background images are not useful and can be discarded such as the audience in a football game, the furniture and decorating items in a conference room.

It is desirable to be able to segment the foreground region and the background region in the images so that the video images can be transmitted efficiently. However, traditional imaging systems use only two-dimensional (2-D) images which cannot provide 3-D information to separate the foreground from the background.

Therefore there is a need in the technology to provide a simple and efficient method for three-dimensional (3-D) segmentation.

SUMMARY

The present invention is a method and apparatus to segment a three-dimensional scene having foreground and background regions. Regions in stereo images of the 3-D scene are matched. The stereo images include left and right images. Ranges of matched regions are computed. The foreground region is separated from the background region using the computed ranges of the matched regions.

BRIEF DESCRIPTION OF THE DRAWINGS

The features and advantages of the present invention will become apparent from the following detailed description of the present invention in which.

DESCRIPTION

The present invention is a method and apparatus to segment 3-D video images. The technique uses stereo imaging. The points of the stereo images are matched. The ranges of the matched points are then computed to create a range map. From the range map, the foreground region can be separated from the background region.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
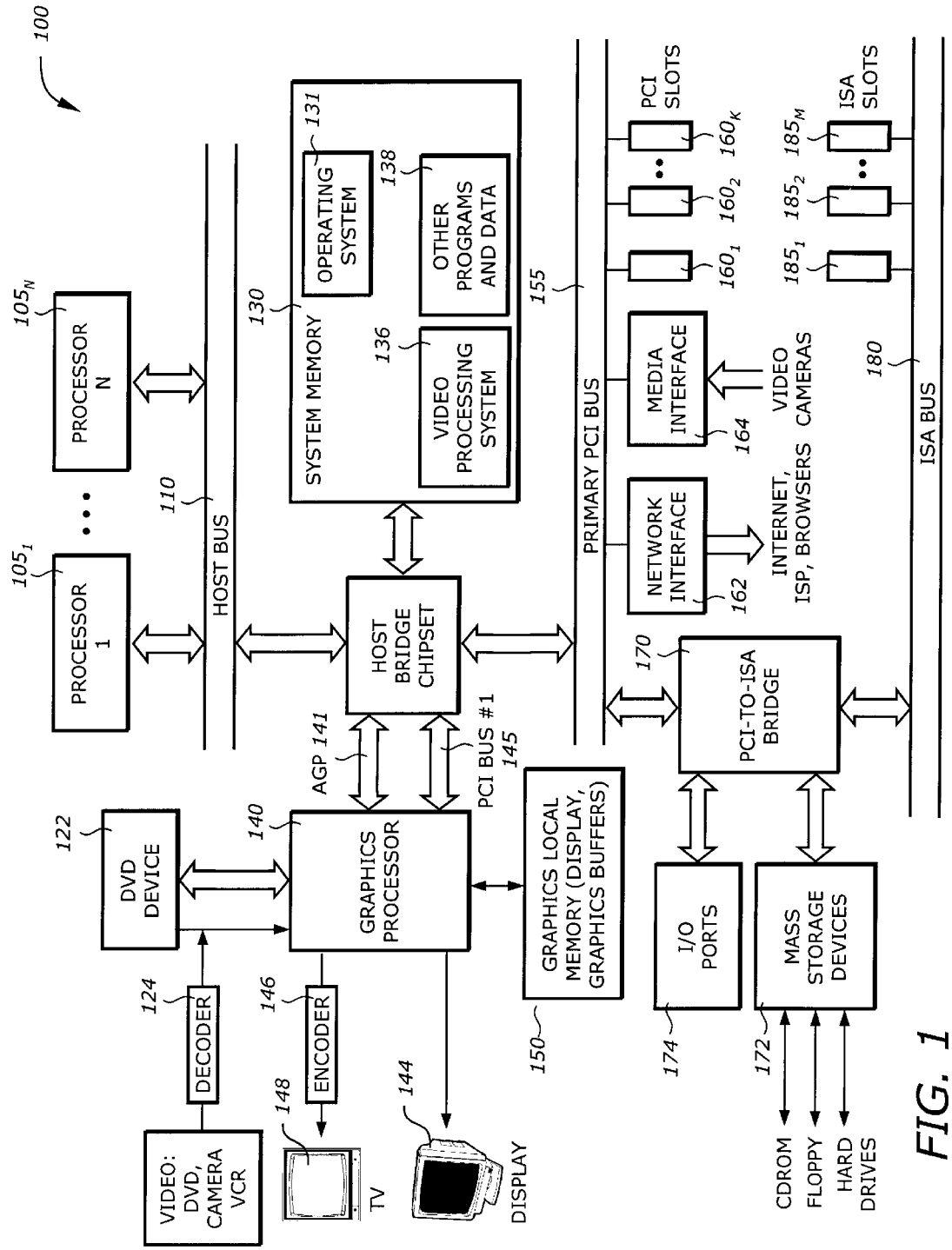
FIG. 1 is a diagram illustrating a system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge chipset 120, a system memory 130, a graphics processor 140, a digital video disk (DVD) device 122, a video device 142, a decoder 124, a display monitor 144, a television (TV) 148, an encoder 146, a graphics local memory 150, a primary PCI bus #0 155, a PCI bus #1 145, an accelerated graphics port (AGP) 141, K PCI slots $160_1$ to $160_K$, a network interface 162, a media interface 164, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 120 includes a number of interface circuits to allow the host processors $105_1$ to $105_N$ access to the system memory 130, the graphics processor 140, and the primary PCI bus #0 155. The system memory 130 represents one or more mechanisms for storing information. For example, the system memory 130 may include non-volatile or volatile memories. Examples of these memories include flash memory, read only memory (ROM), or random access memory (RAM). The system memory 130 includes an operating system (OS) 131, a video processing system 136, and other programs and data 138. The video processing system 136 includes code and data for the segmentation of 3-D scenes for video compression. Of course, the system memory 130 preferably contains additional software (not shown), which is not necessary to understanding the invention.

When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The PCI slots $160_1$ to $160_K$ provide interfaces to PCI devices. Examples of PCI devices include the network interface 162 and the media interface 164. The network interface 162 connects to communication channel such as the Internet. The Internet provides access to on-line service providers, Web browsers, and other network channels. The media interface 164 provides access to audio and video devices. In particular, the media interface 164 includes an image capture device to capture and digitizes real-time video images from video cameras.

The graphics processor 140 is a high performance graphics controller that perform graphics functions such as 3-D rendering operations, progressive meshes, painting, drawing, etc. The graphics processor 140 is coupled to the host bridge 120 via the AGP 141 and the PCI bus #1 145. In one embodiment, the AGP 141 is developed by Intel Corporation of Santa Clara, Calif. The graphics processor 140 has access to its own graphics local memory 150. The graphic local memory 150 may contain graphics programs and data for displaying. The DVD device 122 represents any digital video device or instrument. The video device 142 provides video input such as DVD, camera, or video cassette recorder (VCR) to the graphics processor 140. The decoder 124 decodes the video signals from the video device 142 to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge provides access to the ISA bus 180, mass storage devices 172, and I/O ports 174. The mass storage devices 172 include CD ROM, floppy diskettes, and hard drives. The ISA bus 180 has a number of ISA slots 1851 to 185M to interface to ISA devices. Examples of ISA devices include data entry devices (e.g., keyboard, mouse), printers, etc.

Figure 2:
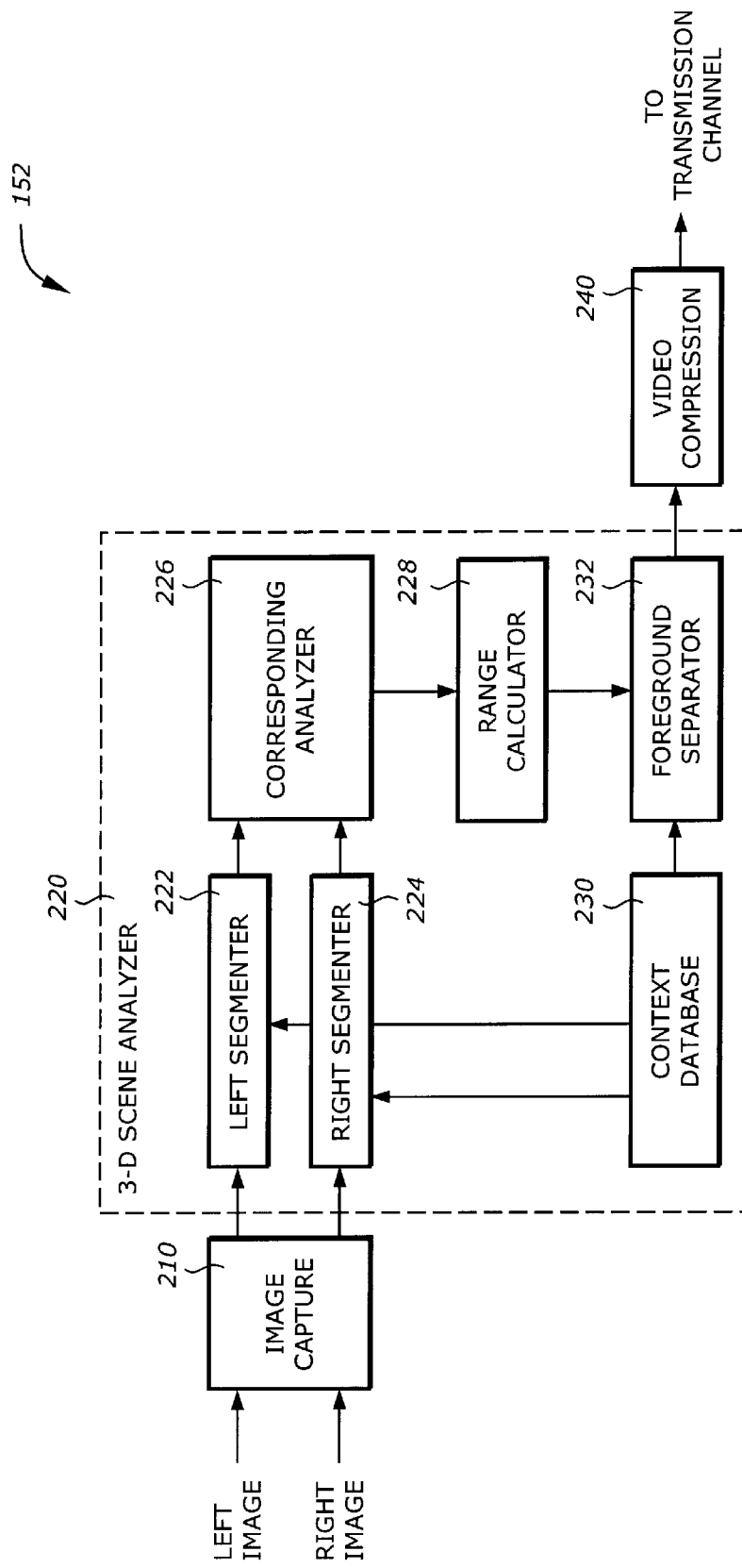
FIG. 2 is a diagram illustrating a video processing system for 3-D scene segmentation according to one embodiment of the invention.

FIG. 2 is a diagram illustrating a video processing system 136 for 3-D scene segmentation according to one embodiment of the invention. The video processing system 135 includes an image capture module 210, a 3-D scene analyzer 220, and a video compression module 230.

The image capture module 210 obtains the stereo images from the cameras. The stereo images of the 3-D scene are captured and digitized in real time. The result is a pair of right and left digitized images. The images may be in color or gray level.

The 3-D scene analyzer 220 segments the 3-D scene into background and foreground regions and generates the foreground region to the video compression module 240. The 3-D segmentation module 220 includes a left segmenter 222, a right segmenter 224, a correspondence analyzer 226, a range calculator 228, a context database 230, and a foreground separator 232.

The left and right segmenters 222 and 224 segment the left and right images, respectively. The segmentation may be performed in each frame or from frame to frame so that clues based on dynamic sequence of images can be exploited. The segmentation, however, is performed within the individual views, namely the right or the left views. The segmentation may include region separation, interest point extraction, edge detection, etc. Region separation may includes region growing, merging, splitting based on some form of similarity measure. Grey level distribution, color, or texture can be used in region separation. Techniques in image clustering may also be employed. Interest points may include points that can be reliably detected. Example of interest points include corner points, landmark points. Contextual information can be exploited to extract interest points such as a priori knowledge about the scene. The result of the left and right segmentation is then used by the correspondence analyzer 226.

The correspondence analyzer 226 determines the corresponding regions or points from the right and left images. The correspondence analyzer 226 matches segmented regions or points from the left image to the right image or vice versa. The objective of the correspondence analysis is to established the correspondence between the left and the right images so that depth or range of regions or points can be computed. Segmented regions or points in one view are matched to those in the other view by using a similarity measure. This similarity measure may be a single measure or a combination of many measures. Examples of such similarity measures include local busyness, local variance, color, intensity, local average. Interest points can be matched based on the relative spatial similarity or based on the local regions that they are located. Techniques for image matching such as correlation analysis, relaxation labeling can be used.

The range calculator 228 receives the list of the matched regions or points of the left and right images from the correspondence analyzer 226 and calculates the depth or ranges of these regions or points. The ranges of individual points are calculated using the camera geometry as will be illustrated later in FIG. 4. Whether the correspondence analyzer 226 provides a list of matched regions or points, the range calculator 228 produces a range map which shows the depth or ranges of the resulting image of the 3-D scene.

The foreground separator 232 obtains the range map as computed by the range calculator 228 and separated the foreground region or regions from the background region or regions. Since the background regions convey uninteresting information, they are masked off in video transmission. Background regions may be transmitted once a while to re-establish the complete image if desired. The foreground separator 232 uses the information from the context database 230 to determine the separation. For example, suppose the approximate range of the foreground regions are known, this a priori knowledge can be used to isolate the regions that fall within the limits from the range map.

The video compression module 240 receives the separated foreground regions and performs the normal compression for transmission over the communication channel. Since the background regions are masked off and a large amount of image data is in the background regions, the motion vector determination can be determined reliably and the compression can be done fast by focusing on only the foreground regions, the compression module 240 deals with less data and is therefore more efficient. Background regions may not necessarily include regions that are not moving, like in teleconferencing, but may also include regions that have extensive motion activities, like in a sport stadium where a sport game is being transmitted. By separating the foreground regions from the background regions, more reliable motion vector estimation can be achieved.

Figure 3:
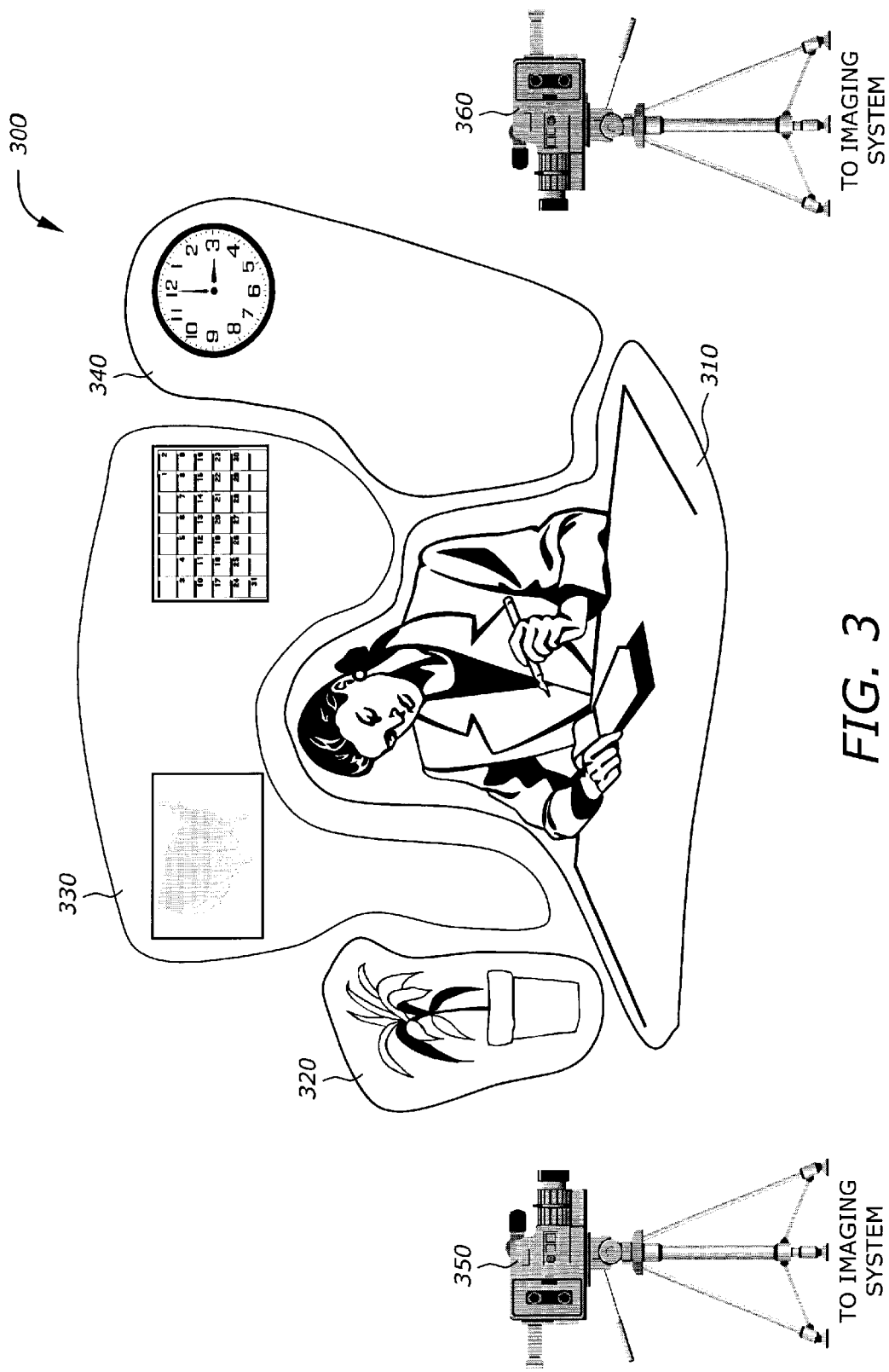
FIG. 3 is a diagram illustrating a three-dimensional scene with stereo imaging according to one embodiment of the invention.

FIG. 3 is a diagram illustrating a three-dimensional scene with stereo imaging according to one embodiment of the invention.

The exemplary 3-D scene 300 depicts a newscaster in a foreground region 310. The background regions 320, 330 and 340 include regions having little motion activities and therefore can be masked off. The stereo cameras 350 and 360 are located in a stereo geometry pointing to the 3-D scene. The stereo cameras 350 and 360 obtain real time video images and transmitted to the imaging system. The stereo images are then captured and digitized by the image capture device. Then the segmentation of the 3-D scene is performed as discussed before.

Figure 4:
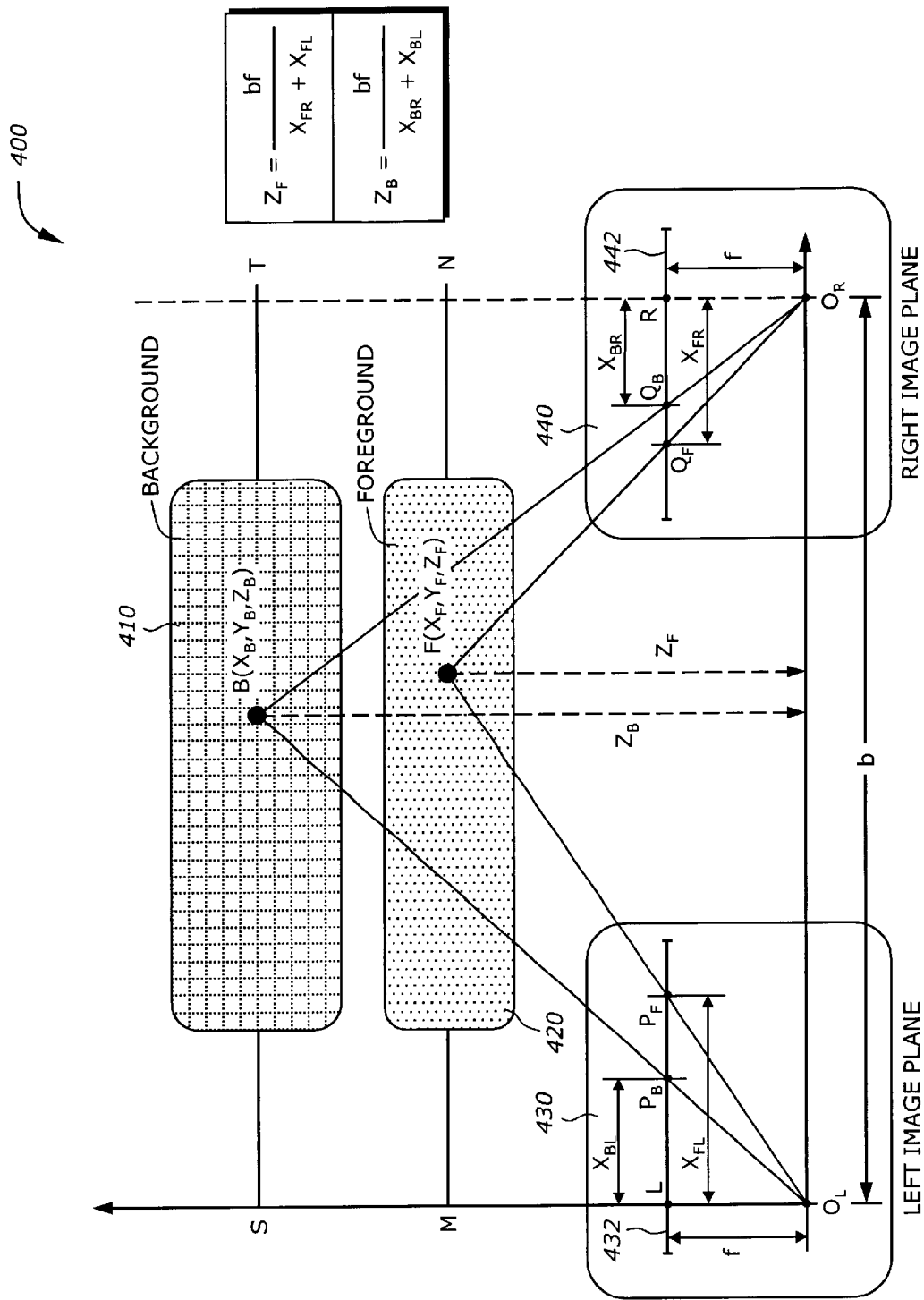
FIG. 4 is a diagram illustrating a stereo imaging geometry according to one embodiment of the invention.

FIG. 4 is a diagram illustrating a stereo imaging geometry 400 according to one embodiment of the invention.

The imaging geometry 400 shows the geometrical relationships of the cameras and the 3-D scene. The camera geometry 400 includes a background region 410, a foreground region 420, a left camera system 430, and a right camera system 440. The center of the coordinate system is at $O_L$ of the left camera system 430.

The background region 410 includes objects that are located at the background of the 3-D scene. Examples of the background objects are spectators in a sports event, hanging pictures in a room, etc. Typically the background region covers objects that are located from a distance farther than objects in the foreground region 420. In the exemplary 3-D scene shown in FIG. 4, the background region 410 includes a background object B located at 3-D coordinates ($x_B$, $y_B$, $z_B$).

The foreground region 420 includes objects that are located at the foreground of the 3-D scene. The foreground region 420 is the region of interest that will be transmitted and compressed. The foreground region 420 may contain objects having high motion activities or static objects. The main criteria to separate the foreground region 420 and the background region 410 include the depth or range of the regions with respect to the camera coordinate system. The foreground region 420 includes a foreground object F located at the 3-D coordinates ($x_F$, $y_F$, $z_F$).

The left camera system 430 has a left image plane 432 and an optical axis $O_L S$. The left image plane 432 and the optical axis $O_L S$ intersects at a point L. The center of the camera $O_L$ is the origin of the camera coordinate system. The focal length of the left camera system is f, which is the distance between the center $O_L$ and the left image plane 432. The object points B and F are imaged at the image points $P_B$ and $P_F$ at the x coordinates of $x_{BL}$ and $x_{FL}$, respectively.

The right camera system 440 has aright image plane 442 and an optical axis $O_R t$. The right image plane 442 and the optical axis $O_R t$ intersects at a point R. The center of the camera system 440, $O_R$, is located at a distance of b from the origin $O_L$ on the x-axis. The focal length of the right camera system 440 is also f. In this camera system, the object points B and F are imaged at the image points $Q_B$ and $Q_F$ at the x coordinates of $X_{BR}$ and $X_{FR}$, respectively.

Let S and T are the projections of the background object point B on the $O_L s$ and $O_R t$ axes, respectively. Let M and N are the projections of the foreground object point F on the $O_L s$ and $O_R t$ axes, respectively. The ranges, or depths, or the object points B and F can be determined from the triangles $SBO_L$, $LP_B O_L$, $MFO_L$, $LPFO_L$, $TBO_R$, $RQ_B OR$, $NFO_R$, and $RQ_F O_R$.

The ranges or depths of the object points B and F can be determined in terms of the image coordinates $x_{FR}$, $x_{FL}$, $x_{BR}$, and $x_{BL}$ as follows:

$$Z_F = bf/(x_{FR}+x_{FL}) \quad (1a)$$

$$Z_B = bf/(x_{BR}+x_{BL}) \quad (1b)$$

Figure 5:
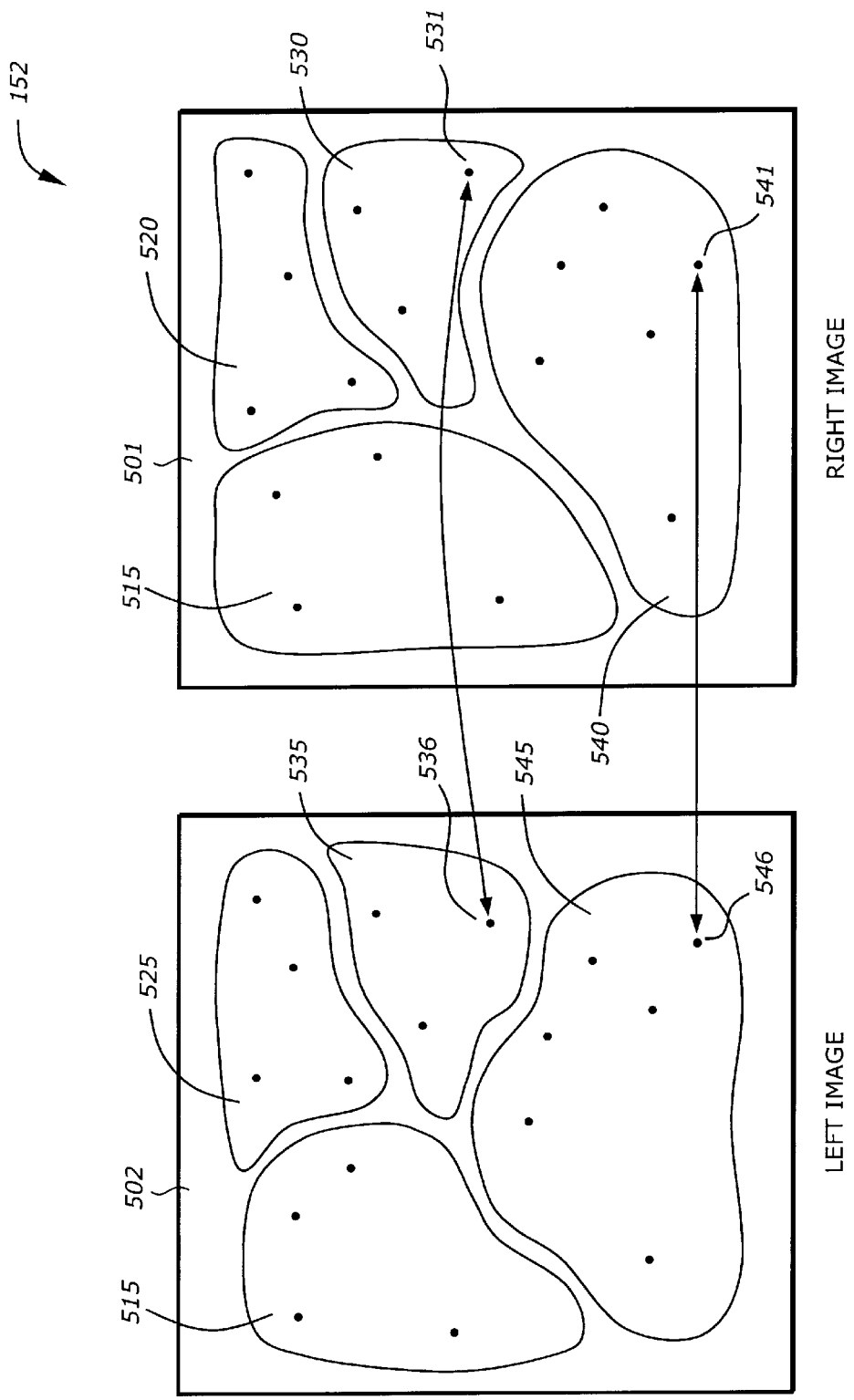
FIG. 5 is a diagram illustrating a view correspondence according to one embodiment of the invention.

FIG. 5 is a diagram illustrating a view correspondence 500 according to one embodiment of the invention. The view correspondence 500 includes a right image 501 and a left image 502.

The right image 501 includes regions 510, 520, 530, and 540. These regions are segmented in the right segmentation process performed by the right segmenter 224 shown in FIG. 2. Each of the regions includes several interest points. For example, region 540 includes an interest point 541, and region 530 includes an interest point 531.

The left image 502 includes regions 515, 525, 535, and 545. These regions are segmented in the left segmentation process performed by the left segmenter 222 shown in FIG. 2. Each of the regions includes several interest points. For example, region 545 includes an interest point 546, and region 530 includes an interest point 536.

The correspondence process is performed by the correspondence analyzer 226 as shown in FIG. 2. The correspondence process can be performed by matching regions or points from one view image to another. The matching can be carried out by using a similarity measure which reflects how similar a region or a point in an image of one view to another region or another point in the image of the other view. As an illustrative example, point 541 is the right image 501 is matched to point 546 in the left image 502. The pair of points 541 and 546 for a pair of corresponding points. Similarly, point 531 in the right image 501 is matched to point 536 in the left image 502.

The pair of points 541 and 546 are the image points. Thus, they do not have depth or range coordinates. They have (x,y) coordinates. Using the equation (1a) or (1b) above, the range of the resulting 3-D object point can be computed. Therefore, for each corresponding pair, a range value is computed. A range map can then be constructed based on these range values.

Figure 6:
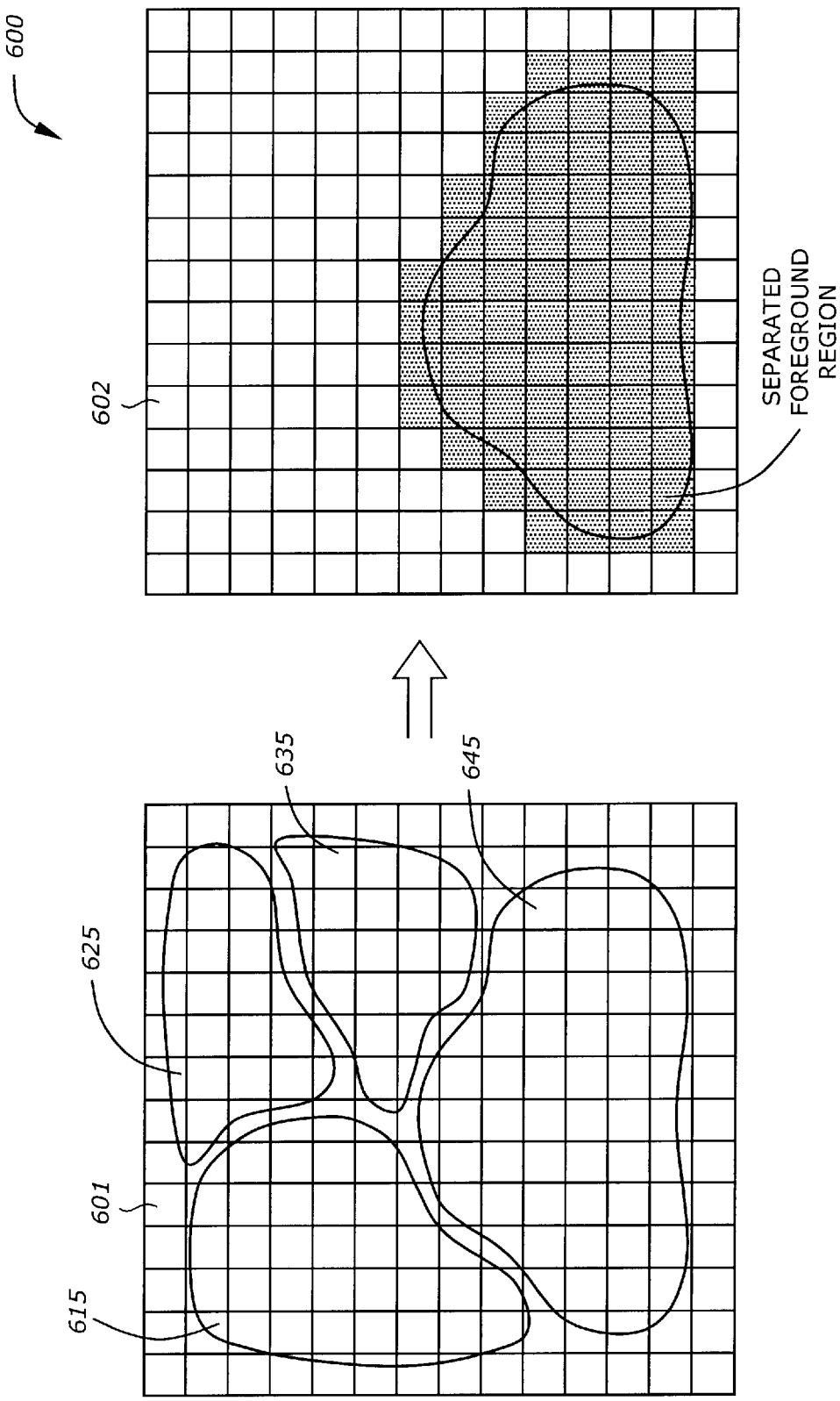
FIG. 6 is a diagram illustrating a range map for foreground separation according to one embodiment of the invention.

FIG. 6 is a diagram illustrating a range map 600 for foreground separation according to one embodiment of the invention. The range map 600 includes a scene range map 601 and a foreground separation 602.

The scene range map 601 includes the ranges as computed in the range calculator 228 as shown in FIG. 2. For each corresponding point pair as determined by the correspondence analyzer 226 (in FIG. 2), the range calculator 228 computes the range using the equation (1a) or (1b). The values of the ranges of these points are then recorded at the location of the image points, either the right or the left image. The scene range map 601 includes the regions 615, 625, 635, and 645 corresponding to the segmented regions 515, 525, 535, and 545 in the left image, or the segmented regions 510, 520, 530, 540 in the right image of FIG. 5.

The contextual information in the context database 230 shown in FIG. 2 can be used to separate the foreground region. For example, the limits of the range of the foreground region may be known a priori (e.g., a sport event). Typically, the foreground region is closer to the camera than the background region. Using this contextual information, the separation of the foreground region can be done easily by thresholding the range map 601. For example, if the range is below the threshold limit, the corresponding point or region belongs to the foreground region. In the example shown in FIG. 6, the region 645 includes the points that have range values below the threshold. The result thresholded range map is the separated foreground region 602.

Figure 7:
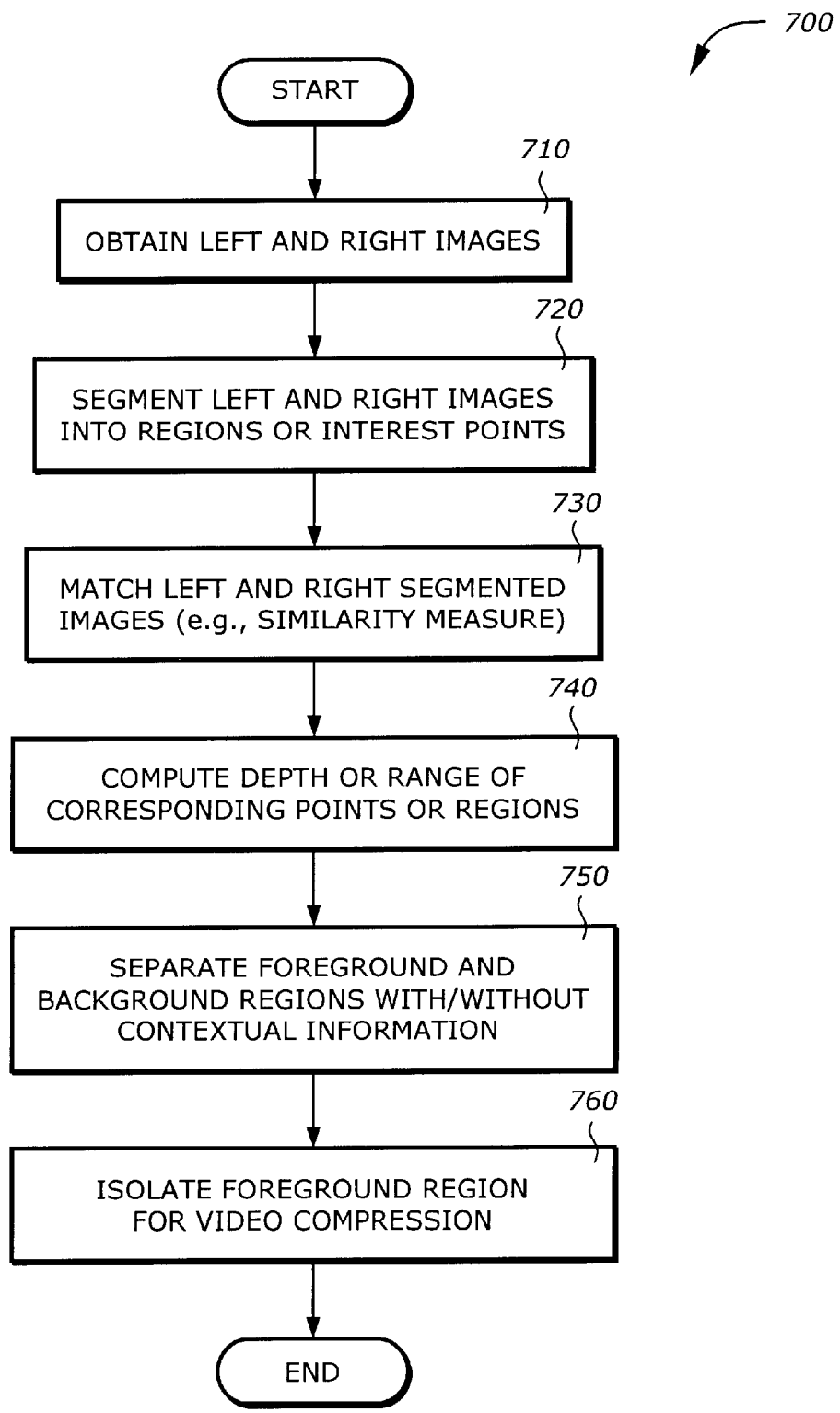
FIG. 7 is a flowchart illustrating a process to segment a 3-D scene according to one embodiment of the invention.

FIG. 7 is a flowchart illustrating a process 700 to segment a 3-D scene according to one embodiment of the invention.

Upon START, the process 700 obtains the left and right images from the image capture module (Block 710). Then the process 700 segments the left and right images into regions or interest points using the left and right segmenter (Block 720). After the left and right images are segmented, the process 700 determines the corresponding regions or points between the left and right images by matching the regions or points (Block 730). The matching can be performed using a similarity measure based on local characteristics such as busyness, variance, average, etc.

Then the process 700 computes the ranges of the corresponding points (Block 740). The range calculation is performed using the equation (1a) or (1b). From these range values, the process 700 separates the foreground and background regions with or without using the contextual information (Block 750). Next, the process 700 isolates the foreground region for video compression and motion vector estimation (Block 760). Then the process 700 is terminated.

Thus, the present invention is a technique to segment a 3-D scene using stereo imaging. The technique segments the left and right images and determines the correspondence between the segmented regions or points. The ranges of the corresponding points are computed. Using these range values, the foreground region can be separated from the background region. The technique is an efficient way to provide video compression.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

matching regions in stereo images of a three-dimensional (3-D) scene, the 3-D scene having foreground and background regions, the stereo images including left and right images;

computing ranges of matched regions; and separating the foreground region from the background region using the computed ranges of the matched regions.

2. The method of claim 1 wherein matching comprises:

segmenting the left and right images into left and right regions, respectively;

determining a characteristic for each of the left and right regions; and matching one of the left regions to one of the right regions based on the characteristics in the one of the left regions and the one of the right regions and a similarity measure.

3. The method of claim 2 wherein the characteristic is one of a local busyness, a local variance, a local color distribution, a local gray level distribution, and a neighborhood spatial relationship.

4. The method of claim 3 wherein matching one of the left regions to one of the right regions comprises:

computing correlation measures between the left and right regions; and selecting the left and right regions that have a best correlation measure.

5. The method of claim 2 wherein the left and right regions include one or more left and right points, respectively.

6. The method of claim 5 wherein computing ranges comprise:

obtaining image coordinates of the matched points, the matched points corresponding to an object point in the 3-D scene; and computing a depth coordinate of the object point using the image coordinates, focal lengths of imaging devices that capture the 3-D scene, and a distance between the imaging devices, the depth coordinate corresponding to the range of the object point.

7. The method of claim 6 wherein separating comprises:

comparing the range of object point to a range limit; and assigning the object point to the background region if the range is less than the range limit.

8. The method of claim 7 wherein the range limit is provided by a context database.

9. The method of claim 8 wherein the range limit is provided by a context database.

10. The computer program product of claim 8 wherein the range limit is provided by a context database.

11. A computer program product comprising:

a computer usable medium having computer program code embodied therein to segment a three-dimensional scene having foreground and background regions, the computer program code comprising:

computer readable program code for matching regions in stereo images of the 3-D scene, the stereo images including left and right images;

computer readable program code for computing ranges of matched regions; and computer readable program code for separating the foreground region from the background region using the computed ranges of the matched regions.

12. The computer program product of claim 11 wherein the computer readable program code for matching comprises:

computer readable program code for segmenting the left and right images into left and right regions, respectively;

computer readable program code for determining a characteristic for each of the left and right regions; and computer readable program code for matching one of the left regions to one of the right regions based on the characteristics in the one of the left regions and the one of the right regions and a similarity measure.

13. The computer program product of claim 12 wherein the characteristic is one of a local busyness, a local variance, a local color distribution, a local gray level distribution, and a neighborhood spatial relationship.

14. The computer program product of claim 13 wherein the computer readable program code for matching one of the left regions to one of the right regions comprises:

computer readable program code for computing correlation measures between the left and right regions; and computer readable program code for selecting the left and right regions that have a best correlation measure.

15. The computer program product of claim 12 wherein the left and right regions include one or more left and right points, respectively.

16. The computer program product of claim 15 wherein the computer readable program code for computing ranges comprise:

computer readable program code for obtaining image coordinates of the matched points, the matched points corresponding to an object point in the 3-D scene; and computer readable program code for computing a depth coordinate of the object point using the image coordinates, focal lengths of imaging devices that capture the 3-D scene, and a distance between the imaging devices, the depth coordinate corresponding to the range of the object point.

17. The computer program product of claim 16 wherein the computer readable program code for separating comprises:

computer readable program code for comparing the range of object point to a range limit; and computer readable program code for assigning the object point to the background region if the range is less than the range limit.

18. The computer program product of claim 17 wherein the range limit is provided by a context database.

19. A system comprising:

an imaging device to capture images of a three-dimensional scene;

a video processor coupled to the imaging device to segment a three-dimensional (3-D) scene having foreground and background regions, the video processor comprising:

a correspondence analyzer to match regions in stereo images of the (3-D) scene, the stereo images including left and right images, a range calculator coupled to the correspondence analyzer to compute ranges of matched regions, and a foreground separator coupled to the range calculator to separate the foreground region from the background region using the computed ranges of the matched regions.

20. The system of claim 19 wherein the correspondence analyzer comprises:

left and right segmenters to segment the left and right images into left and right regions, respectively, the left and right segmenters determining a characteristic for each of the left and right regions; and a stereo matcher coupled to the left and right segmenters to match one of the left regions to one of the right regions based on the characteristics in the one of the left regions and the one of the right regions and a similarity measure.

21. The system of claim 20 wherein the characteristic is one of a local busyness, a local variance, a local color distribution, a local gray level distribution, and a neighborhood spatial relationship.

22. The system of claim 21 wherein the stereo matcher comprises:

a correlator to compute correlation measures between the left and right regions, the correlator selecting the left and right regions that have a best correlation measure.

23. The system of claim 20 wherein the left and right regions include one or more left and right points, respectively.

24. The system of claim 23 wherein the range calculator computes a depth coordinate of the object point using image coordinates of the matched points, focal lengths of imaging devices that capture the 3-D scene, and a distance between the imaging devices, the matched points corresponding to an object point in the 3-D scene, the depth coordinate corresponding to the range of the object point.

25. The system of claim 24 wherein the foreground separator comprises:

a comparator to compare the range of object point to a range limit, the comparator assigning the object point to the background region if the range is less than the range limit.

26. The system of claim 25 wherein the range limit is provided by a context database.

27. The system of claim 26 wherein the range limit is provided by a context database.

* * * * *